Nov. 24, 1970   J. DUDEK ET AL   3,542,999
METAL STRIP HEATING APPARATUS
Filed Nov. 27, 1967   2 Sheets-Sheet 1

Józef DUDEK
Jan GOCZAŁ
Jan GOLEK
Karol JEZIERSKI
Lesław KUŚ
Kazimierz MARKIEWICZ

INVENTORS

BY  Karl F. Ross
Attorney

United States Patent Office 3,542,999
Patented Nov. 24, 1970

1

3,542,999
METAL STRIP HEATING APPARATUS
Józef Dudek, Jan Goczal, Jan Golek, Karol Jezierski, Leslaw Kus, and Kazimierz Markiewicz, Gliwice, Poland, assignors to Instytut Metalurgii Zelaza Im. Stanislawa Staszica, Gliwice, Poland, a corporation of Poland
Filed Nov. 27, 1967, Ser. No. 685,858
Claims priority, application Poland, Dec. 13, 1966, 117,948
Int. Cl. C21d 9/62; H05b 1/00
U.S. Cl. 219—155       4 Claims

ABSTRACT OF THE DISCLOSURE

Apparatus for the heating of a strip shifted between two machine sets of a production line, by means of an electric current passing between two flat electrodes mutually spaced apart and contacting the strip. The electrodes are two brushes supplying the current to the shifting strip, in order to heat it up to a temperature suitable for a determined heat treatment process, e.g. for hardening. The brushes are arranged in guides fitted on a movable mount and pressed against the strip with a controlled pressing force, in order to enable a free motion of the strip while supplying the current without sparking at the contact points.

BACKGROUND OF THE INVENTION

The invention relates to an apparatus for the direct heating of strips between two electrodes in a production line, especially in a plastic working production line, and more particularly to a mobile embodiment of such an apparatus.

Known methods of directly heating metallic strips consist in heating said strips in continuous or pit furnaces, which, for example in a plastic working production line, transport the materials from the machine to the furnace and back, at intermediate annnealings. The methods do not solve the problem of the preheating of the material in front of the rolling mill in order to diminish the folling force, or the problem of heating the material for tempering or putting or another working, after the same leaves the rolling mill.

SUMMARY OF THE INVENTION

The object of the invention is to provide an apparatus for the heating of metal strips which makes it possible—at any time, and with any device or even within a production line—to heat the strips up to a temperature of 1150° C. and to cool them afterwards.

This object is achieved by an apparatus for the method of a strip shifted in a determined production line between two machine sets of this line, comprising at least two flat electrodes mutually spaced apart and mounted on a movable support, and electrodes feeding the electric current to the strip, which on the length of the section between the electrodes is heated up to a temperature suitable for a given manufacturing process.

The strip being shifted in a determined production line, one electrode can be positioned in front of the plastic working or heat treating machine set, the second electrode being provided behind this machine set, for example, in front of the roll stand and behind it.

BRIEF DESCRIPTION OF THE DRAWING

An embodiment of an apparatus for the heating of strips according to the invention is shown in the accompanying drawing, in which.

2

Figure 1:
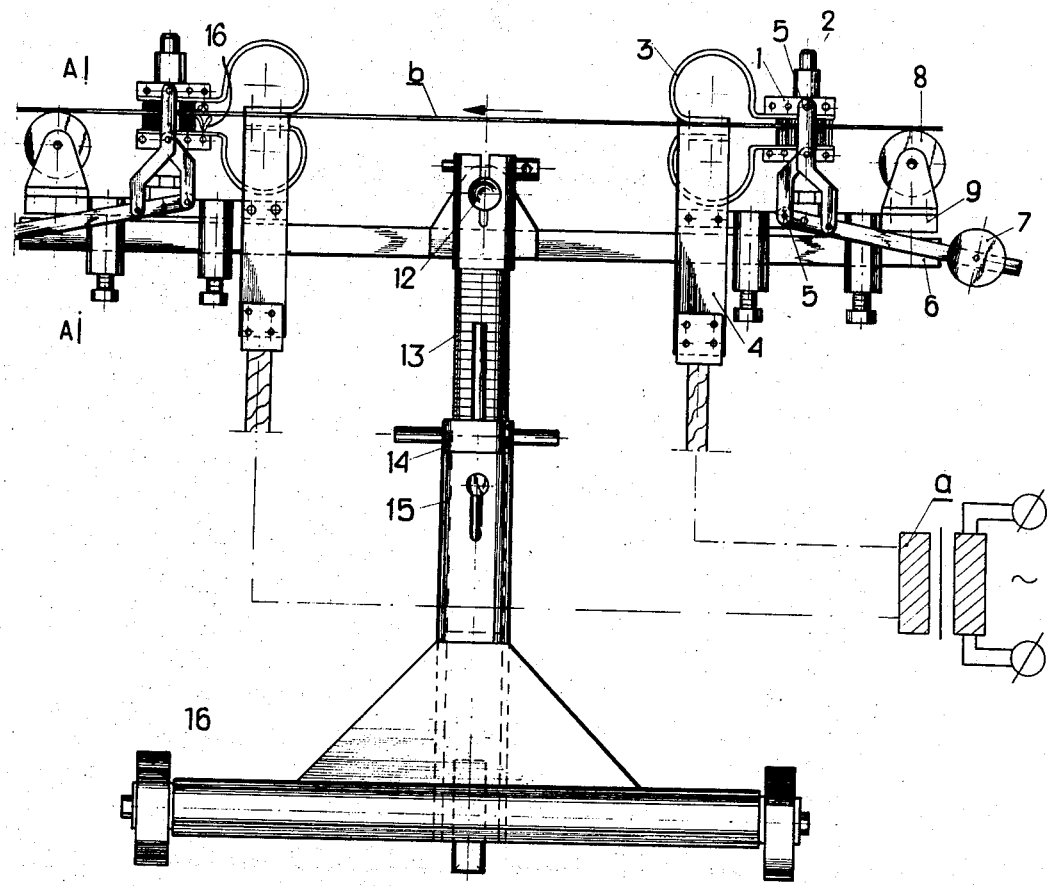
FIG. 1 is a front view of the apparatus.
Figure 2:
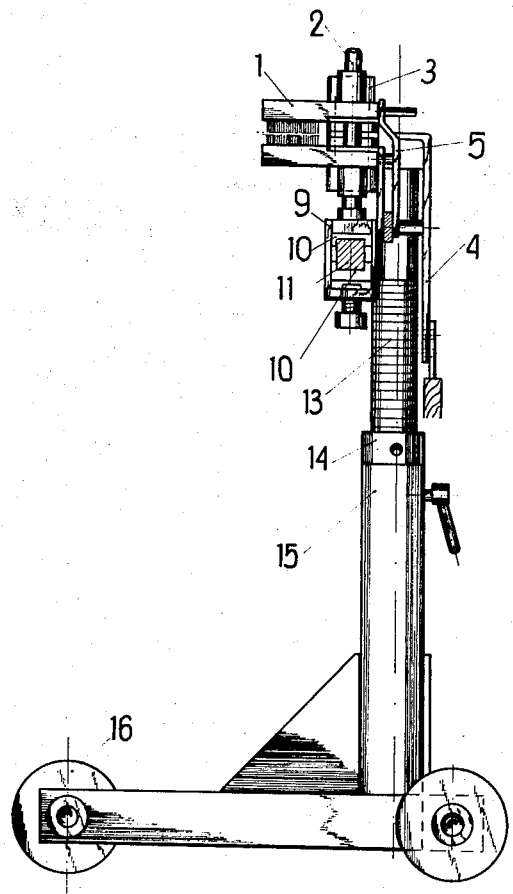

FIG. 2 is a sectional view of the same apparatus along line A—A of FIG. 1.

The apparatus comprises two pairs of mutually spaced apart metallic brushes 1, water-cooled and mounted on guides 2; flexible current cables 3 fastened to the housings of the brushes 1 and making possible to shift the brushes perpendicularly to the plane of the strip; main electrical cables 4; pressing clamping bars 5 adapted to move the brushes along their guides by means of levers 6 provided with weights 7; supporting rolls 8 guiding the strip horizontally between the brushes; stands or carriages 9 shiftable together with their yoke on a supporting beam 11 and insulated therefrom by means of electrical insulating plates 10, the supporting beam 11 is welded on a pin 12 pivotally fitted in a threaded pillar 13 slidingly mounted in a tube 15 secured on a base equipped with wheels 16; a nut 14 is adapted to cooperate with pillar 13.

The flat wire brushes 1 feed the electric current of suitably chosen intensity from the supply transformer $a$ through the main cables 4 and flexible cables 3 to the moving strip $b$ over two surfaces on both sides of the strip, which secures sufficient contact area.

In order to cool the strips additional cooling nozzles 16 are provided in front of the brushes 1 located on the delivery side of the machine set, or downstream side. When setting the brushes on the strip, the lever arm 6 is lifted and the brushes 1 are spread apart to a requested distance. Then, after adjusting the level of the supporting beam 11 of the apparatus and after aligning it horizontally, the beam is taken under the strip which then comes between the brushes 1. The latter are pressed against the strip $b$ by the pressing clamping bars 5 in two opposite directions, which ensure a constant pressing of the brushes on both sides of the strip during operational wear of the brushes. The brushes are guided by the guides 2, in the direction perpendicular to the plane of the strip. In order to hold the strip $b$ in its horizontal position, supporting rolls 8 are used. Due to the fact that the brushes 1, the guides 2, the levers 6, the clamping bars 5 and the rolls 8 are mounted on a common carriage 9, it is possible to set up the distance between the two pairs of brushes 1.

The possibility of setting up the supporting beam at an arbitrary angle, of adjusting the vertical height of the bracket and of shifting the base on its wheels makes the entire apparatus a multi-purpose one, and makes it possible to apply it immediately during a manufacturing process, where solution heat treatment and hardening are requested.

What is claimed is:

1. An apparatus for heating a movable metal strip by passage of an electric current therethrough, comprising an electric current source; two pairs of contacts each with parallel confronting surfaces extending along and engageable with opposite sides of the strip and connected to respective terminals of said source, said pairs of contacts being spaced from one another along said strip; respective lever means operatively linked respectively to each of said pairs for spreading said contacts apart and drawing them together against said strip, said contacts being flat wire brushes with bristles extending substantially perpendicularly to said strip; a wheeled base; a pillar on said base; means for adjusting the height of said pillar with respect to said base; a support beam pivotally mounted on said pillar and carrying said contacts, said lever means including clamp means for spreading apart and bringing together said contacts along a path substantially perpendicular to said strip; and guides for said contacts extending substantially perpendicularly to said strip.

2. An apparatus for heating a movable metal strip by passage of an electric current therethrough, comprising an electric current source; two pairs of contacts each with parallel confronting surfaces extending along and engageable with opposite sides of the strip and connected to respective terminals of said source, said pairs of contacts being spaced from one another along said strip; respective lever means operatively linked respectively to each of said pairs for spreading said contacts apart and drawing them together against said strip, said contacts being flat wire brushes with bristles extending substantially perpendicularly to said strip; a wheeled base; a pillar on said base; means for adjusting the height of said pillar with respect to said base; a support beam pivotally mounted on said pillar and carrying said contacts; and nozzle means at the pair of contacts downstream with respect to the direction of movement of said strip for cooling said strip.

3. An apparatus for heating a movable metal strip by passage of an electric current therethrough, comprising an electric current source; two pairs of contacts each with parallel confronting surfaces extending along and engageable with opposite sides of the strip and connected to respective terminals of said source, said pairs of contacts being spaced from one another along said strip; respective lever means operatively linked respectively to each of said pairs for spreading said contacts apart and drawing them together against said strip, said contacts being flat wire brushes with bristles extending substantially perpendicularly to said strip; a wheeled base; a pillar on said base; means for adjusting the height of said pillar with respect to said base; a support beam pivotally mounted on said pillar and carrying said contacts; two carriages slidingly mounted on said support beam and carrying respectively said contacts and said lever means; roller means adjustably secured on said carriages adjacent said contacts for guiding said strip; and electrical insulators between said support beam and said carriages.

4. An apparatus according to claim 3, wherein said carriages are provided with relatively fixed terminals connected to said current source, and flexible electrical conductors connected to said fixed terminals at one end and to said contacts at the other end.

References Cited
UNITED STATES PATENTS

| | | | |
|---|---|---|---|
| 435,111 | 8/1890 | Burton | 219—155 |
| 453,162 | 5/1891 | Ries | 219—155 |
| 1,629,345 | 5/1927 | Koref | 219—155 |

JOSEPH V. TRUHE, Primary Examiner

L. A. ROUSL, Assistant Examiner